(12) United States Patent
Heeke et al.

(10) Patent No.: US 12,264,895 B2
(45) Date of Patent: Apr. 1, 2025

(54) SYSTEMS AND TECHNIQUES FOR FACILITATING ARCHERY

(71) Applicants: Laser Technology, Inc., Centennial, CO (US); Kama-Tech (HK) Limited, Hong Kong (HK)

(72) Inventors: Neil T. Heeke, Golden, CO (US); Jeremy G. Dunne, Parker, CO (US)

(73) Assignees: Laser Technology, Inc., Centennial, CO (US); Kama-Tech (HK) Limited, Hong Kong (CN)

( * ) Notice: Subject to any disclaimer, the term of this patent is extended or adjusted under 35 U.S.C. 154(b) by 570 days.

(21) Appl. No.: 17/324,967

(22) Filed: May 19, 2021

(65) Prior Publication Data
US 2021/0364252 A1   Nov. 25, 2021

Related U.S. Application Data

(60) Provisional application No. 63/027,707, filed on May 20, 2020.

(51) Int. Cl.
*F41G 1/467* (2006.01)
*F41B 5/14* (2006.01)
*G01P 3/36* (2006.01)

(52) U.S. Cl.
CPC ............ *F41G 1/467* (2013.01); *F41B 5/1403* (2013.01); *G01P 3/36* (2013.01)

(58) Field of Classification Search
CPC ...... F41G 1/467; F41B 5/1403; F41B 5/1484; G01P 3/36; G01P 3/685
See application file for complete search history.

(56) References Cited

U.S. PATENT DOCUMENTS

| | | | | |
|---|---|---|---|---|
| 6,666,089 B2 * | 12/2003 | Dilz, Jr. | ................. | A63B 71/00 |
| | | | | 73/488 |
| 6,898,971 B2 * | 5/2005 | Dilz, Jr. | ................. | G01S 13/583 |
| | | | | 73/488 |
| 7,337,773 B2 * | 3/2008 | Simo | ....................... | F41B 5/143 |
| | | | | 124/44.5 |
| 8,316,551 B2 * | 11/2012 | Gorsuch | ................. | F41G 1/467 |
| | | | | 124/87 |
| 8,733,168 B2 * | 5/2014 | Donahoe | ................. | G01P 3/665 |
| | | | | 73/488 |
| 9,212,868 B2 * | 12/2015 | Roman | ..................... | F41G 1/54 |
| 9,377,272 B2 * | 6/2016 | Morrison | ................ | F41G 1/467 |
| 9,429,392 B1 * | 8/2016 | Ledbetter | .................. | F41G 1/35 |
| 9,448,036 B2 * | 9/2016 | Samuels | ................. | F41G 1/473 |
| 9,576,484 B2 | 2/2017 | Chung | | |
| 9,677,849 B2 * | 6/2017 | Morrison | ................ | F41G 1/467 |
| 9,784,824 B2 | 10/2017 | Dunne | | |

(Continued)

OTHER PUBLICATIONS

Meitin, P; "Arrow Speed vs. Penetration: What Matters For Most Bowhunting?"; North American Whitetail; Sep. 22, 2010, https://www.northamericanwhitetail.com/editorial/huntingtactics_naw_momentum_0710/263719.

(Continued)

*Primary Examiner* — Yaritza Guadalupe-McCall
(74) *Attorney, Agent, or Firm* — Hogan Lovells US LLP

(57) ABSTRACT

Systems and techniques for facilitating archery implemented in conjunction with a bow mountable laser-based speed measurement instrument or a speed sensor bar as well as a bow movement sensor system which may be affixed to any of the available mounting positions on a conventional bow.

8 Claims, 5 Drawing Sheets

(56) References Cited

U.S. PATENT DOCUMENTS

| | | | |
|---|---|---|---|
| 10,401,118 B2* | 9/2019 | Donahoe | G06F 3/04847 |
| 10,852,205 B2* | 12/2020 | Dunham | G01L 5/04 |
| 11,073,356 B2* | 7/2021 | Pell | A63B 23/03508 |
| 11,255,638 B2* | 2/2022 | Roman | F41G 3/08 |
| 2002/0162391 A1* | 11/2002 | Dilz, Jr. | G01S 7/35 |
| | | | 73/488 |
| 2004/0159153 A1* | 8/2004 | Dilz, Jr. | G01S 7/352 |
| | | | 73/489 |
| 2005/0123883 A1* | 6/2005 | Kennen | F41G 1/467 |
| | | | 434/11 |
| 2006/0011182 A1* | 1/2006 | Simo | F41B 5/143 |
| | | | 124/24.1 |
| 2016/0327642 A1* | 11/2016 | Saegusa | G01S 13/88 |
| 2021/0364252 A1* | 11/2021 | Heeke | F41B 5/1484 |
| 2022/0196363 A1* | 6/2022 | Allgaier | F41B 5/1476 |
| 2023/0251055 A1* | 8/2023 | Vaquer | F41B 5/1403 |
| | | | 124/89 |
| 2024/0191966 A1* | 6/2024 | Hanley | F41B 5/1476 |

OTHER PUBLICATIONS

Unknown Author, "Preventing bow arm shake—archery," https://improveyourarchery.com/preventing-bow-arm-shake/.

* cited by examiner

SYSTEMS AND TECHNIQUES FOR FACILITATING ARCHERY

CROSS REFERENCE TO RELATED APPLICATIONS

The present application is a non-provisional of and claims priority to U.S. Provisional Patent Application Ser. No. 63/027,707 filed on May 20, 2020, the disclosure of which is specifically incorporated herein by this reference in its entirety as if fully set forth herein. The present invention is also related to the subject matter disclosed in commonly owned U.S. Pat. Nos. 9,784,824 and 9,576,484, the disclosures of which are specifically incorporated by this reference as if fully set forth herein.

BACKGROUND OF THE INVENTION

The present invention relates, in general, to the field of archery. More particularly, the present invention relates to systems and techniques for facilitating archery in conjunction with a laser-based speed and distance measuring device.

Knowing arrow speed is important and especially so with respect to three dimensional (3D) targets. An understanding of this factor is described, for example, in Meitin, P; "Arrow Speed vs. Penetration: What Matters For Most Bowhunting?"; North American Whitetail; Sep. 22, 2010 (c.f. https://www.northamericanwhitetail.com/editorial/huntingtactics_naw_momentum_0710/263719).

The ability to hold the bow steady in archery is also an important consideration such that the aim point of the arrow remains as constant as possible while shooting at a target. See, for example, "Preventing bow arm shake—archery" (https://improveyourarchery.com/preventing-bow-arm-shake/)

SUMMARY OF THE INVENTION

Disclosed herein are systems and techniques for facilitating archery implemented in conjunction with a bow mountable laser-based speed measurement instrument or a speed sensor bar as well as a bow movement sensor system which may be affixed to any of the available mounting positions on a conventional archery bow. The speed measurement instrument may utilize its tripod mounting hole, the bows stabilizer mounting hole, and a bracket to properly position the speed measurement instrument for measuring the arrow speed.

In a particular implementation of a laser-based speed measurement instrument in accordance with the systems and techniques of the present invention plano-convex lenses may be attached to the transmission and reception apertures of the device to provide divergent cones of transmitted and reflected laser energy. The speed sensor bar may also be advantageously affixed to the stabilizer mounting hole of the bow. The bow movement sensor may also be configured utilizing either an accelerometer or rate gyro in a small package for mounting on a convenient location on a bow.

The optical chassis of a laser-based speed measurement instrument in accordance with the systems and techniques of the present invention is also provided with a 10× target magnification capability along with brighter optics of particular applicability with specific types of targets and in low light operational conditions. Through the mounting of the laser-based speed measurement instrument disclosed and utilized herein as also disclosed, the instrument may be utilized by the archer with one hand while holding the grip of the bow with the other hand thereby providing enhanced bow stability.

Particularly disclosed herein is a system for an archery bow which comprises an arrow speed measurement instrument, the instrument being attachable to the bow and directable toward an arrow flown from the bow. A processor is associated with the instrument for calculating a speed of the flown arrow.

Also particularly disclosed herein is bow movement sensor system which comprises: a movement sensing module, a communication module coupled to the movement sensing module, a bow movement indicator coupled to the movement sensing module and a power source for the movement sensing and communication modules as well as the movement indicator. The bow movement indicator may provide at least one of visual, auditory or sensory indications to an archer utilizing the bow.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DETAILED DESCRIPTION OF A REPRESENTATIVE EMBODIMENT

Figure 1:
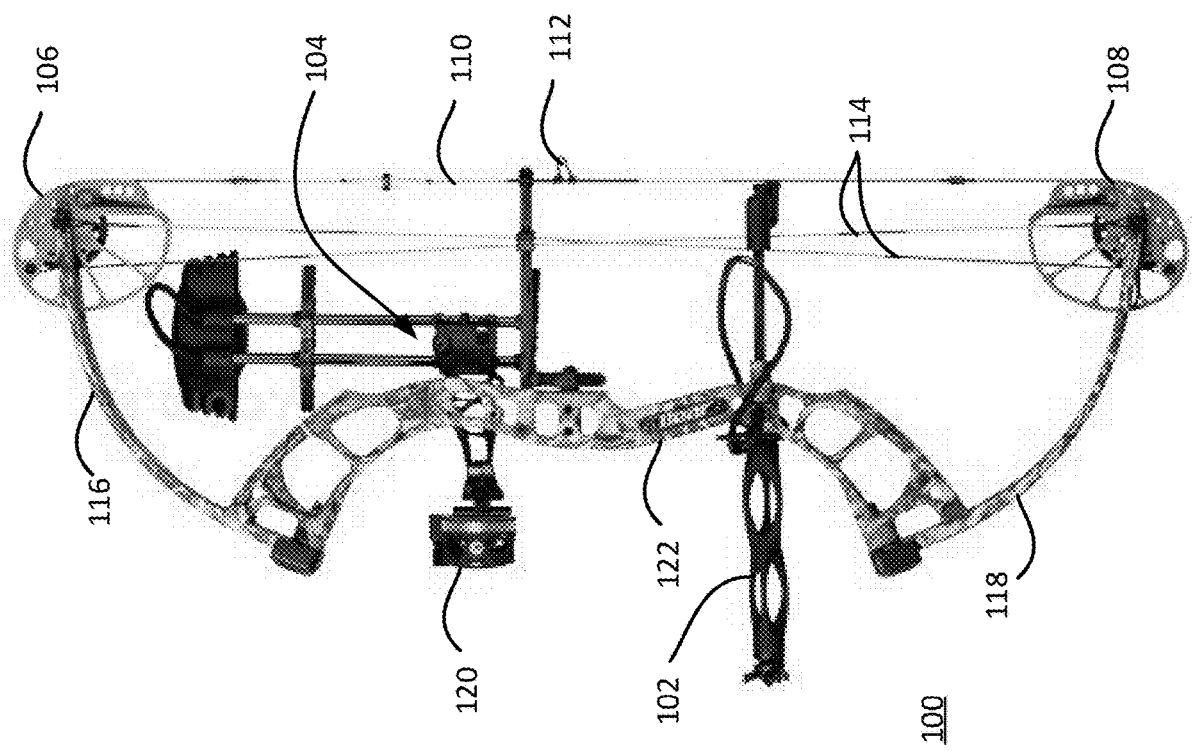
FIG. 1 is a side elevational view of a representative archery bow for use in conjunction with the systems and techniques of the present invention.

With reference to FIG. 1, a side elevational view of a representative archery bow 100 for use in conjunction with the systems and techniques of the present invention is shown.

The bow 100 comprises, in pertinent part, a stabilizer 102 and arrow quiver mounting position 104 for utilization in conjunction with particular, representative implementations of systems and techniques in accordance with the disclosure of the present invention. Conventionally, the bow 100 comprises oppositely disposed idler cam 106 and cam 108 at the respective top and bottom ends of the bow 100.

A bow string 110 is stretched between the cams 106, 108 and may include a nocking loop 112. The idler cam 106 is secured to the bow 100 upper limb 116 while the cam 108 is secured to the bow 100 lower limb 118. Cables 114 are also coupled between the idler cam 106 and the cam 108. The bow 100 is further illustrated as incorporating a bow sight 120 to enable an archer to aim an arrow by looking through the bow 100 peep sight (not illustrated; located just above reference numeral 110) on the bow string 110 at a selected target while holding the bow 100 at the grip 122 thereof.

Figure 2:
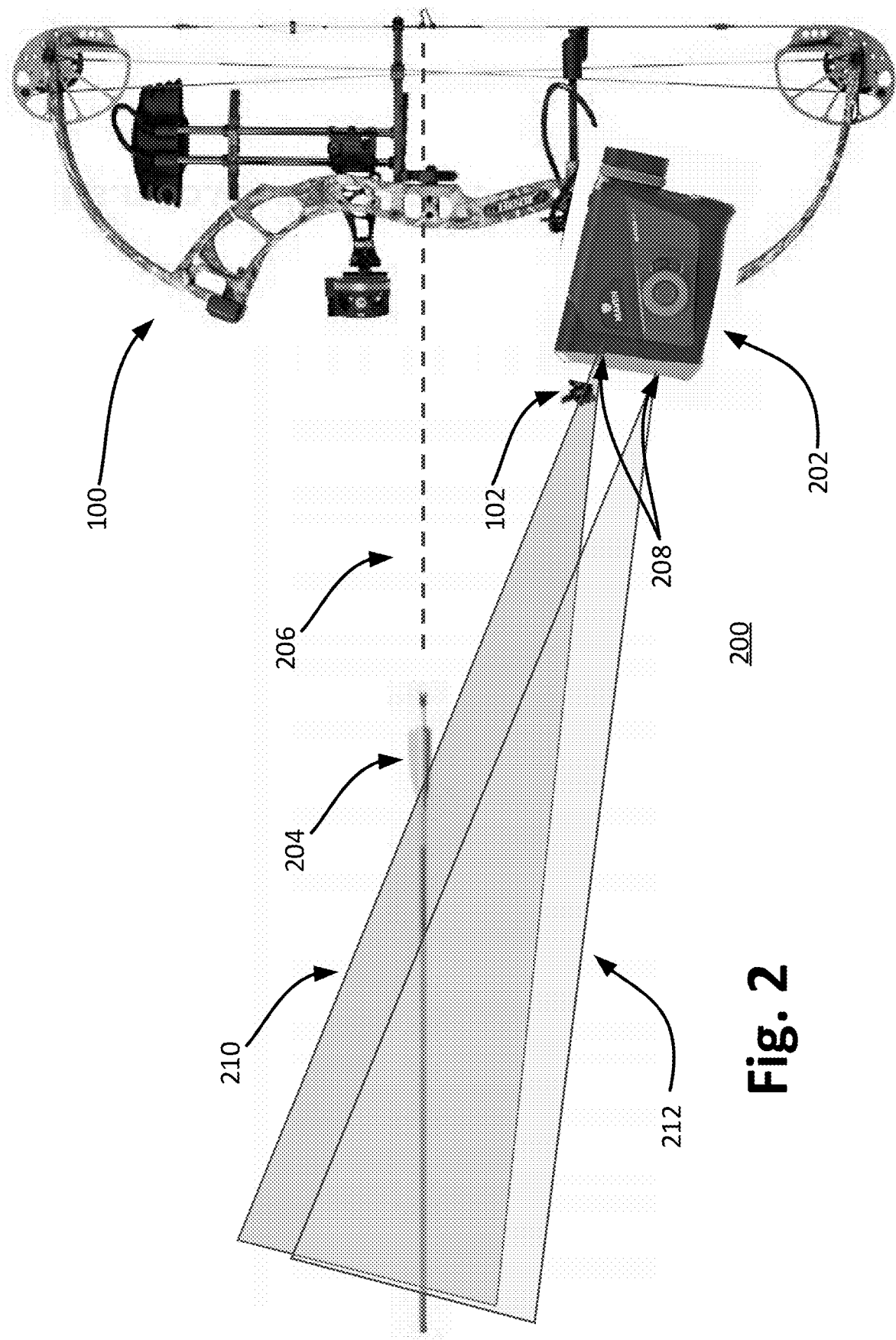
FIG. 2 is an additional view of the bow of the preceding FIG. 1 illustrative of a particular representative implementation of a system and technique in accordance with the principles of the present invention for determination of arrow speed utilizing a laser-based speed measurement instrument affixed, for example, to the bow frame or stabilizer mount of the bow.

With reference additionally now to FIG. 2, an additional view of the bow 100 of the preceding FIG. 1 is shown illustrative of a particular representative implementation of a system and technique 200 in accordance with the principles of the present invention for determination of arrow speed utilizing a laser-based speed measurement instrument 202 affixed, for example, to the stabilizer 102 or stabilizer mount of the bow. With respect to this figure, elements previously illustrated and described with respect to FIG. 1 are like numbered and the foregoing disclosure thereof shall suffice herefor. In this regard in particular, the complete length of the stabilizer 102 is obscured by a thereupon mounted laser-based speed measurement instrument 202 and only the distal end is illustrated.

Particularly illustrated is an arrow 204 in flight along its flight path 206 as loosed or flown from the bow 100. The laser-based speed measurement instrument 202 may be configured, in an exemplary embodiment, with molded plastic plano-convex lenses 208 affixed to the laser-based speed measurement instrument 202 beam transmit (Tx) and receive (Rx) apertures to provide a divergent transmitted beam 210 and an overlapping field of view of the reflected beam 212 over shorter distances. The processor (not shown) of the associated speed measurement instrument 202 is operative to then calculate the speed of the arrow 204 along the flight path 206. Laser Technology's proprietary TruCapture® technology disclosed, for example, in the aforementioned U.S. Pat. No. 9,576,484, utilizes expanding optics, such as the plano-convex lenses 208, to create an elongated laser emission and reception beams with an optimum detection range for the application shown. A small ring of reflective tape or a reflective nock may be placed around the arrow 204 to increase the reflectance of the transmitted beam 210 to improve the accuracy of the measurement.

In this exemplary system and technique of the present invention the calculated speed of the arrow 204 may be displayed on the insight laser-based speed measurement instrument 202 or otherwise communicated to an associated device such as a smartphone, tablet or other electronic display device utilizing Bluetooth Light Energy (BLE) or other nearfield communication technologies.

Figure 3:
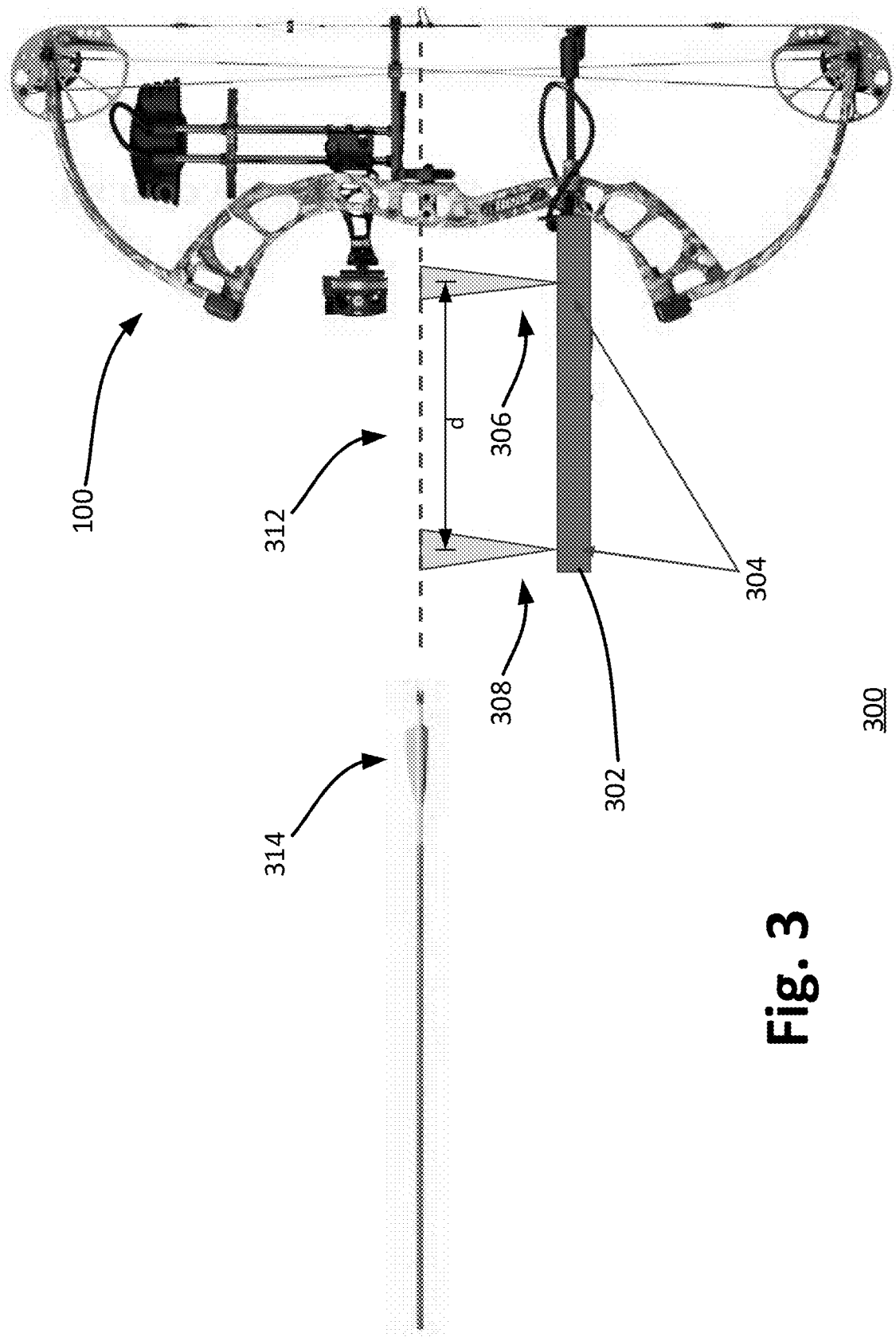
FIG. 3 is a further view of the bow of the preceding figures illustrative of an additional representative implementation of a system and technique in accordance with the principles of the present invention for determination of arrow speed utilizing a pair of horizontally displaced light emitters and detectors affixed, for example, to the stabilizer or stabilizer mount of the bow.

With reference additionally now to FIG. 3, a further view of the bow 100 of the preceding figures is shown illustrative of an additional representative implementation of a system and technique 300 in accordance with the principles of the present invention for determination of arrow speed utilizing a pair of horizontally displaced light emitters and detectors affixed, for example, to the stabilizer (element 102, FIGS. 1 and 2) of the bow 100.

In this particular exemplary implementation of the system and technique 300, a sensor bar 302 may be affixed to the stabilizer mounting hole of the bow 100. The sensor bar 302 comprises first and second pairs of horizontally displaced light emitters and detectors 306 and 308 respectively at positions 304 along the length of the sensor bar 302. The first and second pairs of horizontally displaced light emitters and detectors 306 and 308 are separated by a determined distance "d".

As the arrow 314 is loosed from the bow 100 along its flight path 312, it first passes by light emitters and detector pair 306 and then light emitter and detector pair 308. A ring of reflective material around the arrow 314 or a reflective nock provides a strong signal response for the detectors to more accurately trigger the passing of the arrow 314. With the time between the passing of the arrow 314 between pairs 306 and 308 and the distance between them "d" being known, the speed of the arrow 314 may be determined by, for example, the processor of a an associated laser-based speed measurement instrument (e.g. instrument 202 of FIG. 2; not shown) or other microprocessor based device. The light emitter and detector pairs 306, 308 may comprise light emitting diodes (LEDs) with associated sensors or other suitable light emitting sources and detectors. The arrow 314 may advantageously incorporate a ring of reflective paint or tape to further facilitate the operation of the sensor bar 302 as desired.

The sensor bar 302 may further include an associated user viewable display (not shown) indicating the speed of the arrow and/or be coupled via Bluetooth Light Energy (BLE) or similar near field communication method to an archery specific laser rangefinder or associated laser-based speed measurement instrument 202. The processor of the archery specific laser rangefinder again is operative to calculate the speed of the arrow.

Figure 4:
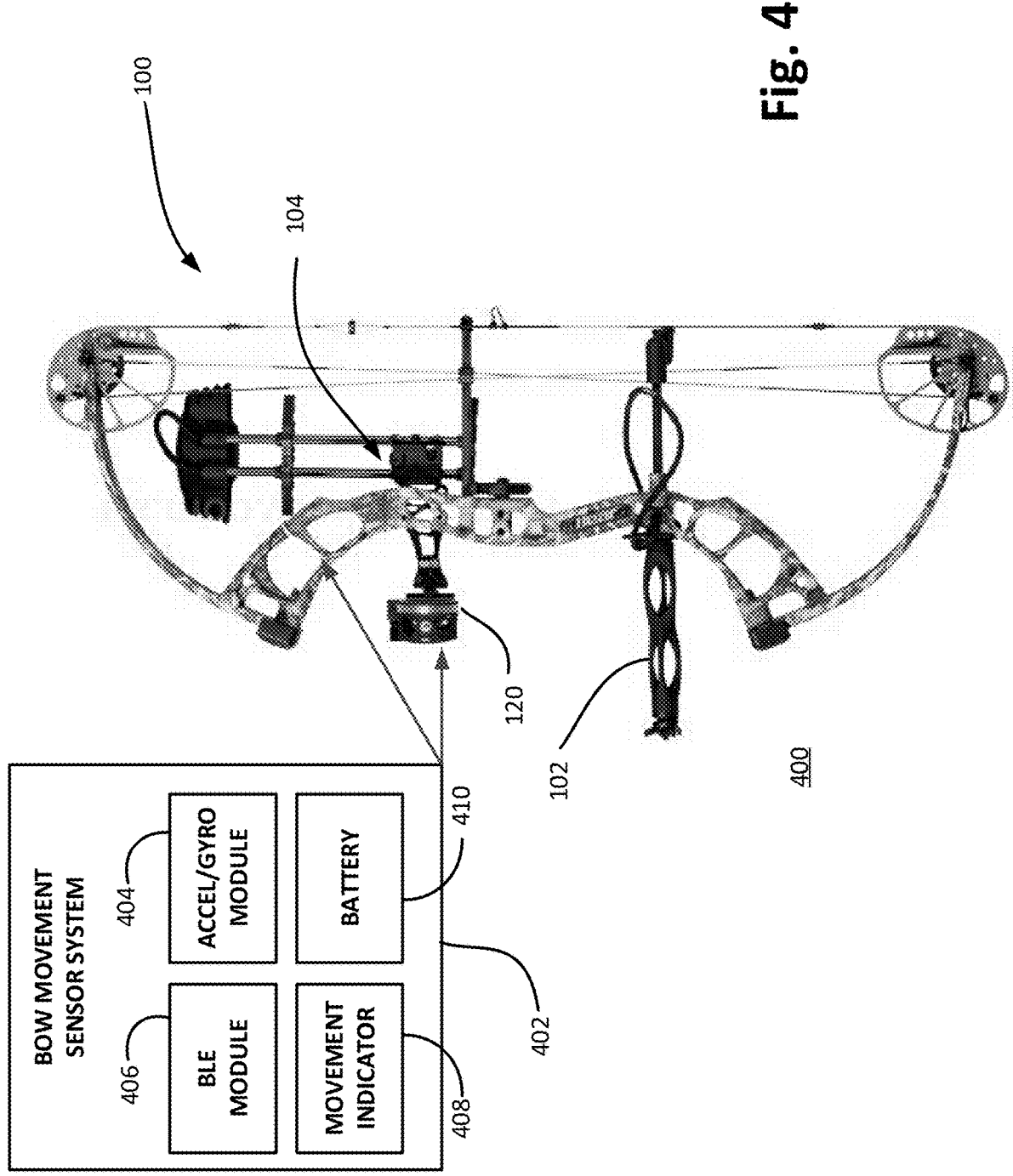
FIG. 4 is a still further view of the bow of the preceding figures illustrative of a representative implementation of a bow movement sensor which may be affixed at a particular position on the bow to indicate to the archer that there is movement of the bow due to shake in the archer's hand, wind effecting the stability of the bow or other external factors.

With reference additionally now to FIG. 4, a still further view of the bow 100 of the preceding figures is shown illustrative of a representative implementation of an additional system and technique 400 in accordance with the principles of the present invention is shown as implemented by a bow movement sensor 402 which may be affixed at a particular position on the bow to indicate to the archer that there is movement of the bow due to shake in the archer's hand, wind effecting the stability of the bow or other external factors. The bow movement sensor system 402 may be conveniently provided as a small, lightweight unit affixed to any of the numerous available mounting points on the bow 100.

The bow movement sensor system 402 comprises, in pertinent part, an accelerometer or rate gyro module 404 and an associated BLE (or other near field communication function) module 406. A movement indicator 408 may include one or more of visual (e.g. LED lights), auditory (e.g. sound or tone annunciator) or sensory (e.g. haptic) indicators to a user of the bow 100 that there is movement of the bow 100 affecting the aim point of an arrow to be flown. The bow movement sensor 402 also incorporates an onboard power source for the modules 404, 406 and indicator 408 in the form of a battery 410 and may be implemented in a small lightweight box or other enclosures.

In operation, the bow movement sensor 402 will pick up the shaking of the bow 100 and provide feedback to the archer in the form of visual, auditory or other sensory indications. It will also pick up movement of the bow 100 caused by wind thereby enabling an archer to become more proficient at holding the bow 100 steady or letting an arrow fly when wind conditions improve. Output from the bow movement sensor 402 may also be utilized to send a perceived value to a smartphone application (app) for subsequent evaluation.

In those implementations of the bow movement sensor system 402, accelerometer/gyro module 404 implemented utilizing a rate gyro, the use of such component in conjunction with an Analog to Digital Converter (ADC) may be realized in accordance with the disclosure and teaching of the aforementioned U.S. Pat. No. 9,784,824.

Figure 5:
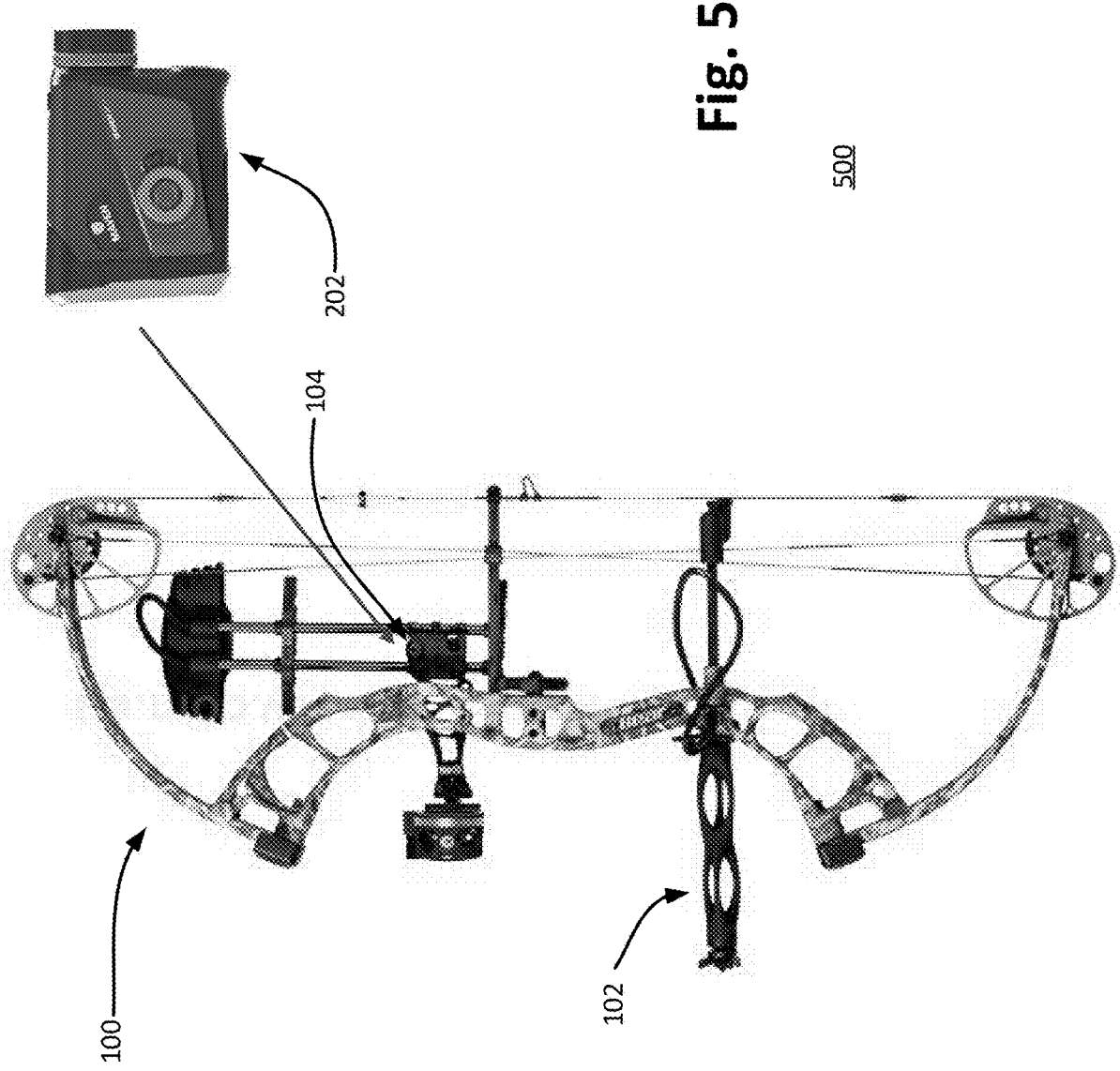
FIG. 5 is an additional further view of the bow of the preceding figures illustrative of an advantageous position on the bow for selective mounting of a laser-based speed measurement instrument in accordance with a particular implementation of a system and technique in accordance with the principles of the present invention.

With reference additionally now to FIG. 5, an additional further view of the bow 100 of the preceding figures is shown illustrative of an advantageous position on the bow 100 for selective mounting of a laser-based speed measurement instrument 202 in accordance with a particular implementation of a system and technique 500 in accordance with the principles of the present invention. In this exemplary implementation of the system and technique 500, the laser-based speed measurement instrument 202 is conveniently mounted in conjunction with the quiver mounting position 104. In this manner the bow 100 would then provide additional stabilizing effects to the laser-based speed measurement instrument 202 as it is supported by the user's second hand.

Through the implementation of the system and technique 500 illustrated, the bow 100 holds the laser-based speed measurement instrument 202 when not in use which enables an archer to stabilize the bow 100 while his other hand operates the instrument 202. In this manner, the bow 100 need not be set down while the instrument 202 is operated.

As illustrated and described herein with respect to the foregoing, the laser-based speed measurement instrument 202 disclosed may form a speed measurement function of an archery application specific laser rangefinding device having features, optical assembly, hardware, firmware and software for implementation of the systems and techniques of the present invention. The laser-based speed measurement instrument 202 advantageously provides a 10× magnification capability for improved target ring identification in all applications and specifically for those involving 3D targets as opposed to conventional instruments having only 6× or 7× magnification capabilities. The laser-based speed measurement instrument 202 disclosed may also be implemented so as to provide improved low light condition operation as opposed to conventional instruments. Conventional magnifications of only 6× or 7× do not provide sufficient magnification for a user to see the scoring rings in conjunction with 3D targets.

A laser-based speed measurement instrument 202 in accordance with the present invention may also provide an archer with a 3D scoring function. Inasmuch as most competitions involve 20 or 40 targets, the following exemplary and representative score values may be assigned: Miss the target completely=0 points; Hit the target outside of any targeting rings=5 points; The arrow is within the large target ring=8 points; The arrow is in the medium target ring=10 points; and the arrow is in the small target ring=12 points. The instrument 202 may also enable an archer to enter a default score and allow him to adjust up or down to one of the other point values. A user actuatable button on the instrument would enable entry of the score for each target. Further, the instrument can also provide a running score or estimated final score based on the user set up. The laser-based speed measurement instrument 202 may also comprise a display for providing a view of the score to the archer.

While there have been described above the principles of the present invention in conjunction with specific systems and techniques for facilitating archery, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

As used herein, the terms "comprises", "comprising", or any other variation thereof, are intended to cover a non-exclusive inclusion, such that a process, method, article, or apparatus that comprises a recitation of certain elements does not necessarily include only those elements but may include other elements not expressly recited or inherent to such process, method, article or apparatus. None of the description in the present application should be read as implying that any particular element, step, or function is an essential element which must be included in the claim scope and THE SCOPE OF THE PATENTED SUBJECT MATTER IS DEFINED ONLY BY THE CLAIMS AS ALLOWED. Moreover, none of the appended claims are intended to invoke paragraph six of 35 U.S.C. Sect. 112 unless the exact phrase "means for" is employed and is followed by a participle.

What is claimed is:

1. A user induced bow shake sensor system mountable to said bow comprising:
 a shake sensing module, said shake sensing module comprising a rate gyro and an associated analog to digital converter;
 a communication module coupled to said shake sensing module;
 a bow shake indicator coupled to said shake sensing module;
 a power source for said shake sensing and communication modules as well as said bow shake indicator; and
 an associated processor coupled to said shake sensing and communication modules for calculating shake of said bow and determining an approximate center of said user induced bow shake and informing said user through said bow shake indicator whether said user induced bow shake is within a certain established tolerance of said determined approximate center.

2. The bow shake sensing system of claim 1 wherein said communication module comprises one of Bluetooth Low Energy or other near field communication medium.

3. The bow shake sensing system of claim 1 wherein said bow shake indicator comprises at least one of visual, auditory or sensory indication of bow shake to said user of said bow.

4. The bow shake sensing system of claim 1 wherein said power source comprises a battery.

5. The bow shake sensing system of claim 1 wherein output of said system is communicated to said processor of an associated arrow speed measurement instrument through said communication module.

6. The bow shake sensing system of claim 1 wherein said arrow speed measurement instrument is mountable to said bow.

7. The bow shake sensing system of claim 1 wherein output of said system is communicated to an application in one of a smartphone or tablet device for subsequent analysis.

8. A system for an archery bow comprising:
- an arrow speed measurement instrument, said instrument attachable to said bow and directable toward an arrow flown from said bow;
- a processor associated with said instrument for calculating a speed of said flown arrow; and
- a sensor bar mountable to a stabilizer mounting position on said bow for directing light toward an arrow flown from said bow, said sensor bar comprising first and second light emitting and detecting pairs of light emitting diodes and associated detectors respectively displaced along a length of said sensor bar and wherein said sensor bar is operatively coupled to said processor for calculating said speed of said flown arrow.

\* \* \* \* \*